Dec. 23, 1947.  H. M. WILKOFF  2,433,081
METHOD OF MAKING IGNITION HARNESS
Filed Dec. 16, 1942  5 Sheets-Sheet 1
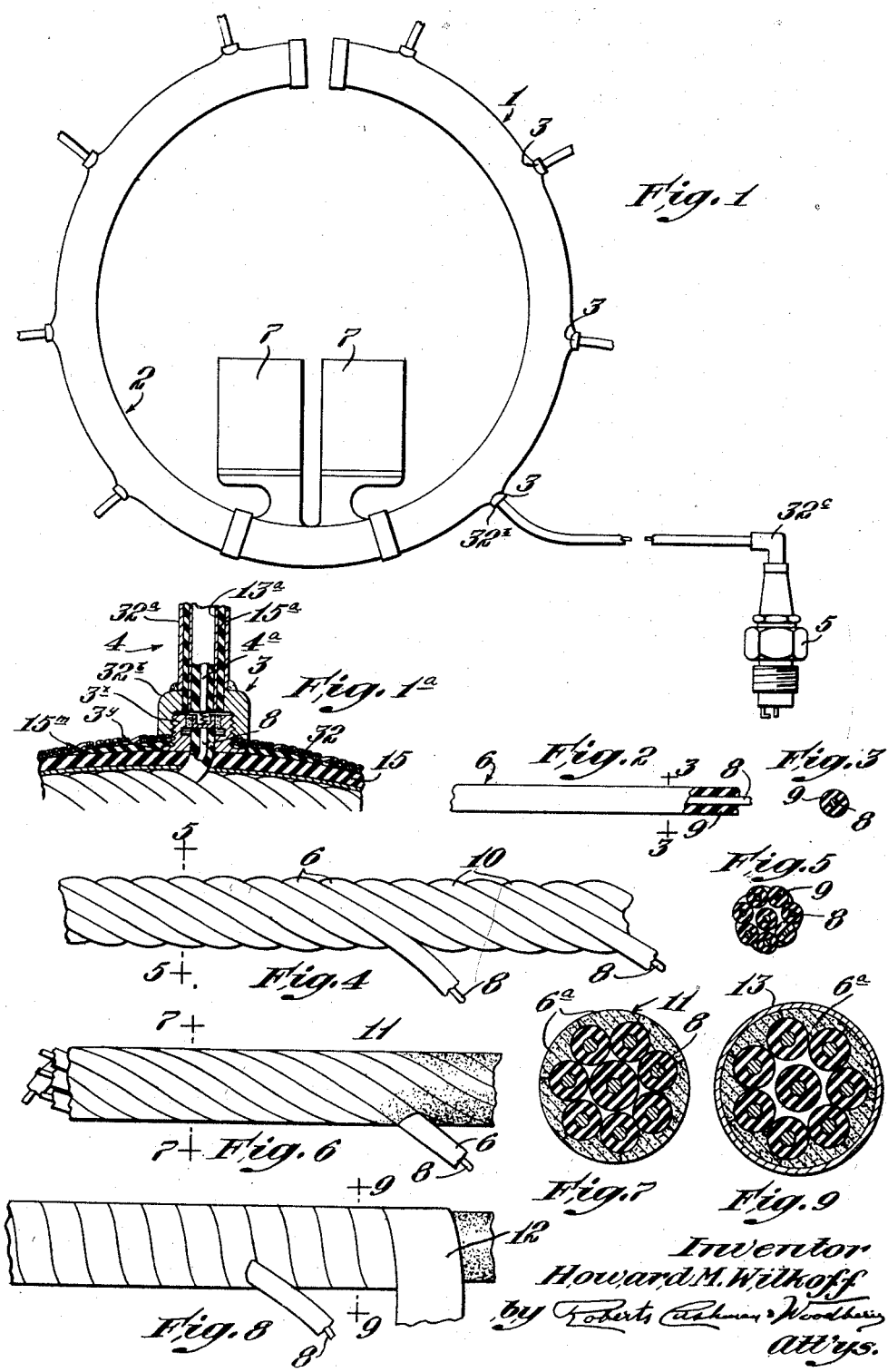

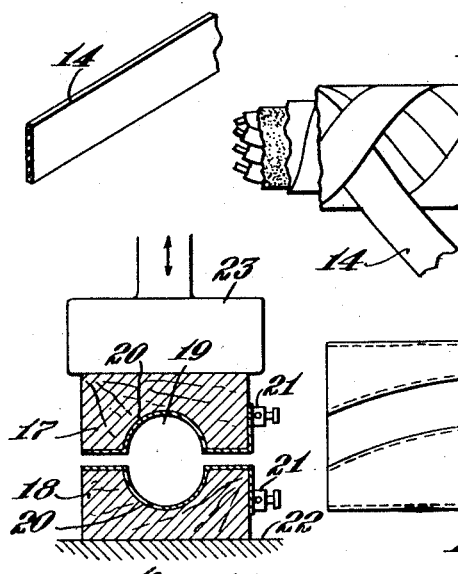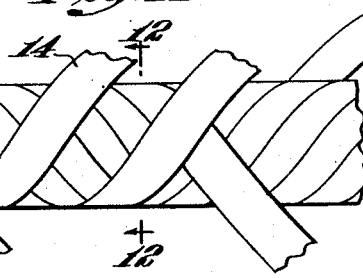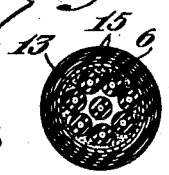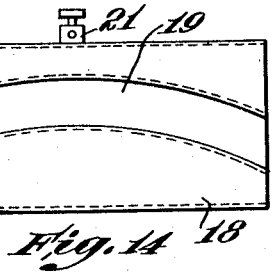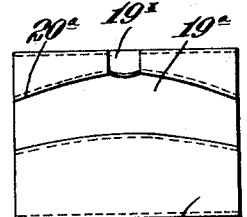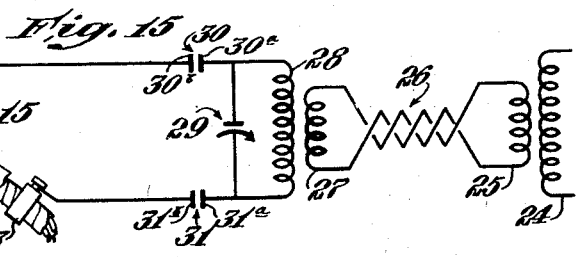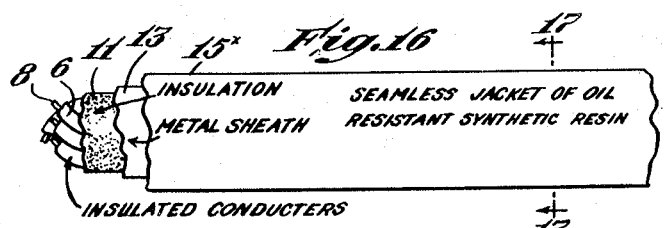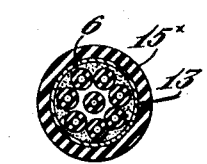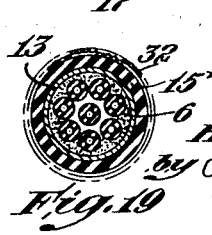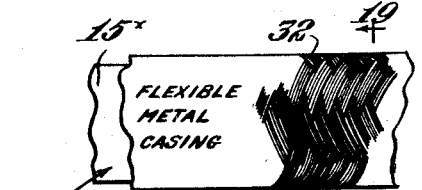

Dec. 23, 1947. H. M. WILKOFF 2,433,081
METHOD OF MAKING IGNITION HARNESS
Filed Dec. 16, 1942 5 Sheets-Sheet 3
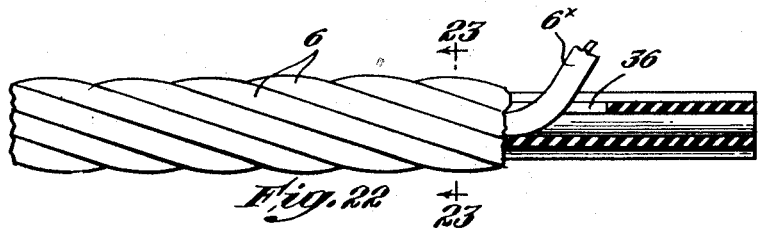
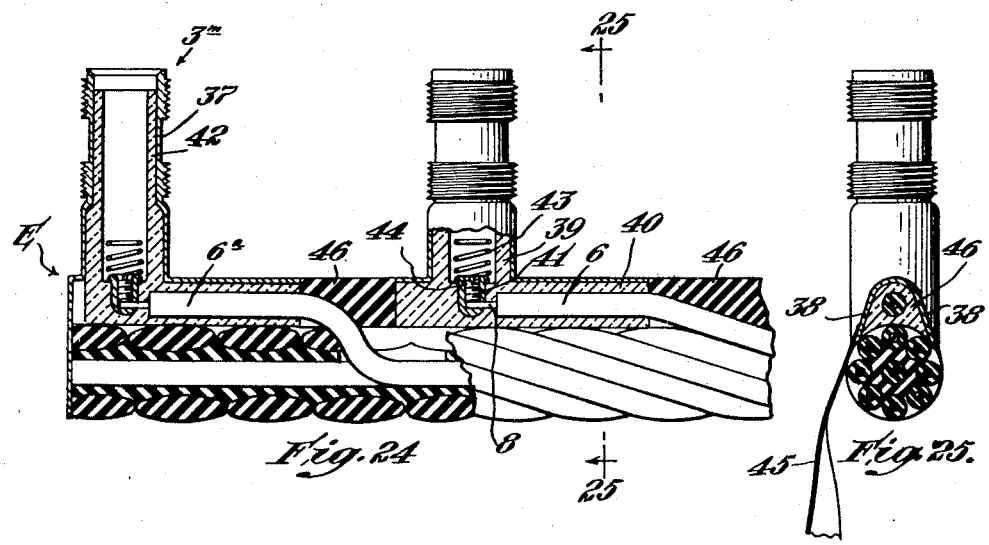
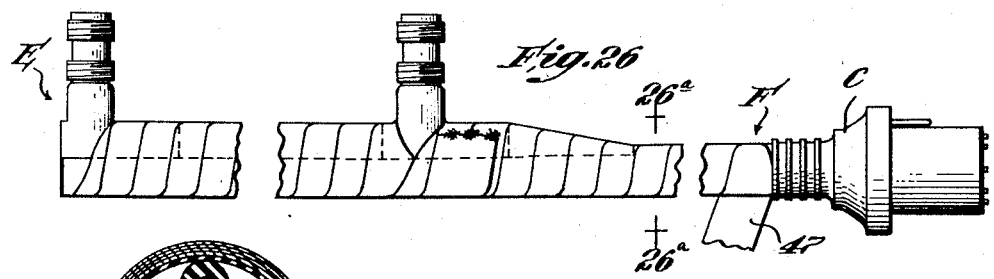
Inventor
Howard M. Wilkoff
by Roberts Cushman Woodberry
att'ys.

Dec. 23, 1947.   H. M. WILKOFF   2,433,081
METHOD OF MAKING IGNITION HARNESS
Filed Dec. 16, 1942    5 Sheets-Sheet 4
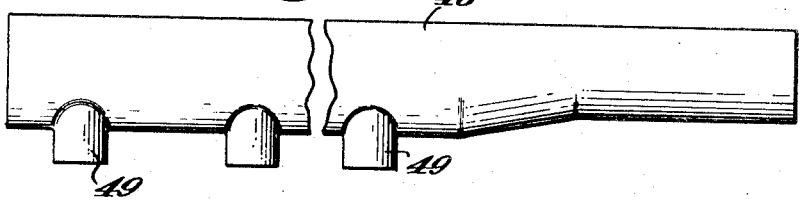
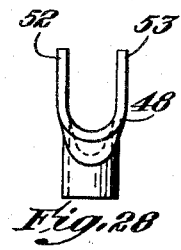
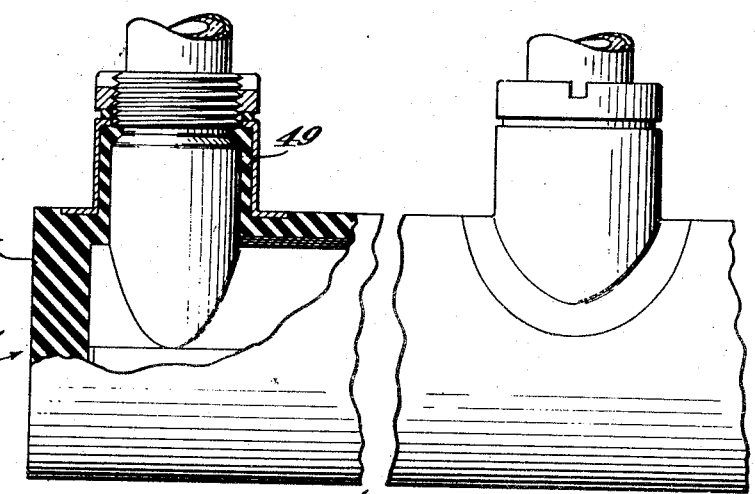
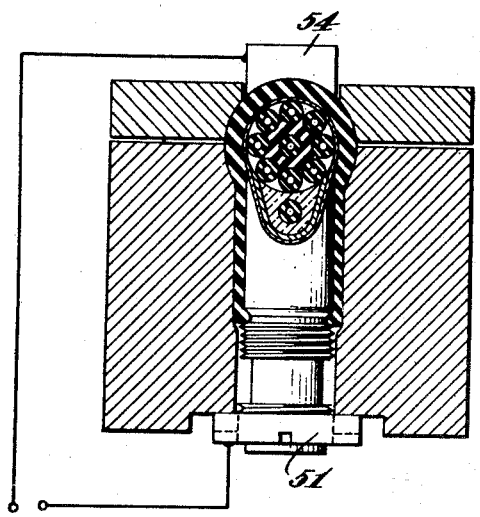
Inventor
Howard M. Wilkoff
By Roberts, Cushman & Woodberry
Attys.

Dec. 23, 1947.  H. M. WILKOFF  2,433,081
METHOD OF MAKING IGNITION HARNESS
Filed Dec. 16, 1942  5 Sheets-Sheet 5
Fig. 32
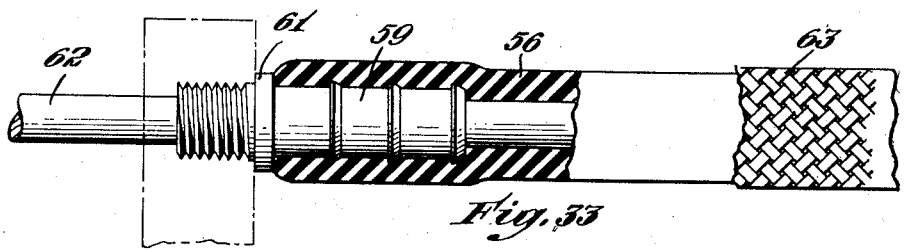
Fig. 33
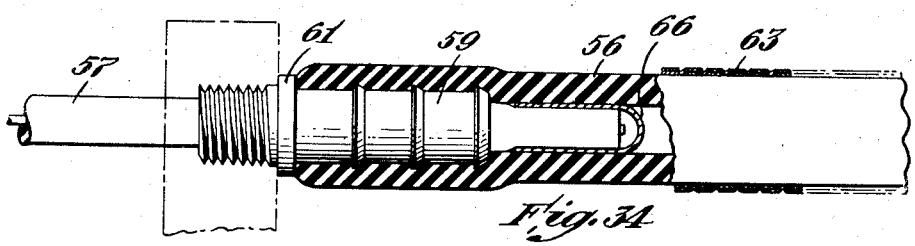
Fig. 34
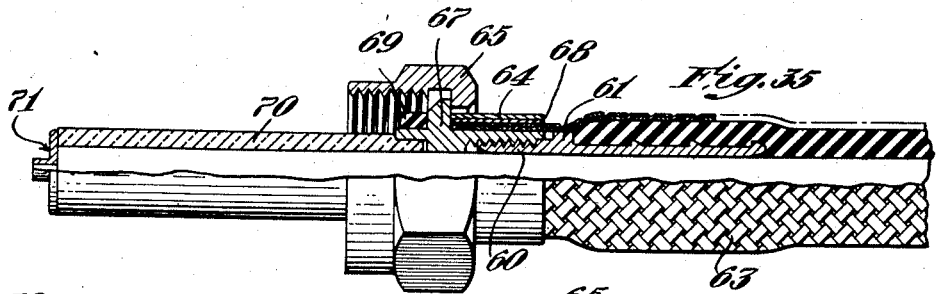
Fig. 35
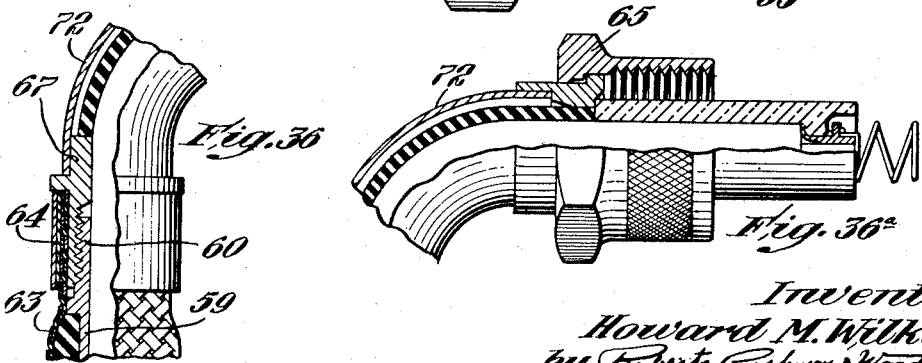
Fig. 36  Fig. 36ª
Inventor
Howard M. Wilkoff
by Roberts Cushman Woodberry
Attys.

UNITED STATES PATENT OFFICE 2,433,081

METHOD OF MAKING IGNITION HARNESS

Howard M. Wilkoff, New York, N. Y.

Application December 16, 1942, Serial No. 469,185

12 Claims. (Cl. 154—2.24)

This invention pertains to ignition harness for internal combustion engines and relates more particularly to an improved method of making such harness, the present application being a continuation-in-part of my copending application Serial No. 371,927, filed December 27, 1940, since issued as Patent No. 2,322,903, dated June 29, 1943.

An ignition harness comprises an assemblage of the various wires leading from the distributor of the internal combustion engine to the spark plugs. While the invention may be of more general utility, it is especially designed as an improvement in methods of making harness used in airplane engines. In some of these engines the cylinders are radially disposed and some have a straight-line arrangement, and the improved harness is applicable to both types of engine.

Considering the radial engine as an example, the harness usually comprises an annular tubular casing which is arranged to extend concentrically with the engine shaft and into which lead the conductors from the magneto or magnetos. These conductors extend along within the casing and at the proper intervals one after another of the conductors is led out through a lateral opening in this casing (or, as it is termed in the art, the "ignition manifold") to the spark plug of one of the respective cylinders. The conductors thus extend to different distances around the circumference of the manifold and the manifold may be of gradually decreasing transverse area, or may be of uniform cross-section throughout its length according to the choice of the designer.

In certain common types of harness the manifold is made of flexible tubing and each conductor extends continuously from the magneto to its respective spark plug. In order to protect the conductors from mechanical injury and to avoid radio interference, it is necessary that each individual conductor be enclosed within metal from the time it leaves the generator until it connects with the spark plug terminal. Thus the ignition manifold is made of metal or is encased with metal and where each conductor leaves the manifold, an outlet fitting is secured to the manifold to which is connected a metal covered conduit, usually flexible, which encloses the conductor and which extends to the spark plug to which it is secured by a special connection.

The conductors used for this purpose, particularly for army and navy use, are very finely constructed, being provided with insulation of the highest quality and are usually covered with a coating of lacquer. However, these finely finished conductors must be put in place in the harness by drawing them in at one end of the manifold, thence part way around the manifold and out through the particular fitting and through the conduit and then through the connection at the other end of the conduit before they can be connected to the spark plug terminal. If done carefully, this operation may be performed without injury to the conductor, but when repairs must be made by those who are not especially skilled or careful or under field conditions in military service, the insulation may be scraped off or injured in pulling the conductor through the irregular channel provided for it, and not only may the particular conductor thus drawn in be injured but the operation may likewise injure the insulation of some of the other conductors already in place. Moreover, since airplane engines are ordinarily provided with double ignition systems, it may happen that if one of the conductors belonging to one of these systems should break down so as to emit sparks within the manifold, its failure may not be noticed during operation of the engine since the other ignition system provides for this emergency, and thus before the defect is discovered the sparking may have seriously injured those conductors which lie in contact with the defective conductor.

In another type of harness, intended in part to avoid the above difficulties, each conductor within the manifold terminates at the point where the corresponding outlet fitting is attached, and the fitting comprises means for mechanically securing the conduit to the manifold and also comprises means whereby the terminal of the conductor within the manifold may be electrically connected to the ignition wire which leads from the outlet fitting through the conduit to the spark plug. In this latter form of manifold it has been proposed permanently to embed the several conductors which are arranged within it in a body of insulating material which is poured into the manifold casing after the assembled conductors have been put in place. However, difficulty is experienced in filling the manifold casing with an insulating medium of appropriate type. The lacquer used at the outer surface of the several conductors may be seriously injured by any solvent which would make the insulating medium sufficiently fluid to flow at normal temperatures into the manifold. Likewise if a solvent be employed, it is difficult to provide for its evaporation from the closed interior of the manifold within any practical period of time. On the other hand, if the insulating material be thermoplastic and be heated sufficiently to soften it, the temperature requisite may be such that the heated insulating material will injure the individual conductors, for example by causing an over-vulcanization of the rubber covering with consequent loss of insulating value. Moreover, since the insulation material which is placed in the manifold must not be brittle at arctic temperatures and must maintain its shape and insulating properties at temperatures to which it may be exposed in the tropics with the engine running, it is difficult to find such a medium which may be flowed into the manifold cavity.

It has also been proposed to encase the conductors in a jacket of rubber and, after vulcanizing the latter, to house the rubber-jacketed cables in the outer metallic casing, but the application of heat sufficient to vulcanize the mass of rubber forming the jacket is injurious to the insulation of the individual conductors and may so decrease the dielectric strength of such insulation as to result in an early breakdown and sparking under conditions of use.

A principal object of the present invention is to provide a method of and novel apparatus useful in the making of such ignition harness and the constituent parts thereof and in particular to provide a method whereby an individually insulated conductor or conductors may be jacketed with an insulating substance which requires heat treatment in its application but without so heating the insulation of the individual conductor as to injure its mechanical or dielectric qualities.

A further object is to provide an improved method whereby, after wrapping an individually insulated conductor or conductors with thermoplastic insulating material to form overlapped plies or a plurality of concentric layers, heat may be applied (or in fact generated) in such a way as to heat said plies or layers sufficiently to permit pressure consolidation and integration thereof without injuriously heating the insulation of the conductor or conductors.

Other and further objects and advantages of the invention will be pointed out in the following more detailed description and by reference to the accompanying drawings, wherein:

Fig. 1 is a diagrammatic front elevation of a harness for a radial type engine, certain of the ignition wires being broken away, only one of the spark plugs being illustrated;

Fig. 1ᵃ is a detail section to large scale, illustrative of a preferred form of fitting at the junction of one of the ignition wires with the manifold;

Fig. 2 is a fragmentary elevation, partly in diametrical section, illustrating one of the conductors which is comprised in the ignition manifold;

Fig. 3 is a section on the line 3—3 of Fig. 2;

Fig. 4 is a fragmentary elevation illustrating a plurality of the conductors arranged to form a cable-like assembly;

Fig. 5 is a section on the line 5—5 of Fig. 4;

Fig. 6 is a fragmentary elevation showing the assembly of Fig. 4 after having its outer surface made smooth and substantially cylindrical;

Fig. 7 is a section on the line 7—7 of Fig. 6;

Fig. 8 is a fragmentary elevation illustrating the step of applying a thin, flexible metallic sheathing to the structure of Fig. 6;

Fig. 9 is a section on the line 9—9 of Fig. 8;

Fig. 10 is a fragmentary perspective view illustrating an oil and moisture-resistant thermoplastic insulating tape useful in providing an insulating jacket for the assembly shown in Fig. 8;

Fig. 11 is a fragmentary elevation illustrating the step of applying the insulating jacket to the assembly of Fig. 8;

Fig. 12 is a section on the line 12—12 of Fig. 11;

Fig. 13 is a vertical section diagrammatically illustrating a multi-part mold device and showing in section fragmentary portions of a press whereby pressure is applied to the mold parts;

Fig. 14 is a plan view of the lower part of the mold of Fig. 13;

Fig. 14ᵃ is a similar plan view of a mold part having a mold cavity of a different formation;

Fig. 15 is a diagrammatic plan view of the mold of Fig. 13 and illustrating means for supplying heat to the wrappings of insulation;

Fig. 16 is a fragmentary elevation illustrating the composite assembly resulting from the use of the apparatus of Fig. 15;

Fig. 17 is a section on the line 17—17 of Fig. 16;

Fig. 18 is a fragmentary section showing the structure of Fig. 16 provided with an outer protective casing;

Fig. 19 is a section on the line 19—19 of Fig. 18;

Fig. 20 is a fragmentary elevation partly in diametrical section, of a core tube employed in accordance with a modified procedure, said view also showing a piece of a conductor, which in accordance with this method, is to be assembled with the core tube;

Fig. 21 is a section of the core tube on the line 21—21 of Fig. 20;

Fig. 22 is a fragmentary elevation, partly in diametrical section, of the core tube and the several conductors associated therewith to form a cable assembly;

Fig. 23 is a section on the line 23—23 of Fig. 22;

Fig. 24 is a fragmentary vertical section showing one end of the harness as it appears before the outer jacket has been put in place and before the metallic sheathing has been applied;

Fig. 25 is an elevation, partly in section, on the line 25—25 of Fig. 24;

Fig. 26 is a fragmentary side elevation of the harness as it appears when the metallic sheathing has been partly applied and the magneto connection attached to one end of the harness;

Fig. 26ᵃ is a transverse section substantially on the lines 26ᵃ—26ᵃ of Fig. 26 and to much larger scale, showing the arrangement of the metallic sheathing in the completed harness;

Fig. 27 is a fragmentary side elevation of a jacket of insulating material as it appears before it is applied to the assembly of Fig. 26;

Fig. 28 is an end elevation of the device shown in Fig. 27;

Fig. 29 is a transverse section of a diagrammatic character illustrating the step of coalescing the longitudinal edges of the jacket material about the conductor assembly;

Fig. 30 is a transverse section through the harness after the longitudinal seam has been formed;

Fig. 31 is a fragmentary side elevation, partly in vertical section, showing one end of the harness and the completed closed end of the jacket;

Fig. 32 is a fragmentary longitudinal section of an insulating tube used in forming one of the ignition leads, and also showing, in elevation, a connector which is employed at each end of the tubing;

Fig. 33 is a fragmentary side elevation, with parts broken away and parts in vertical section, illustrating the step of securing the connector of Fig. 32 to one end of the tubing;

Fig. 34 is a fragmentary vertical section illustrating the step of introducing the conductor into the tubing;

Fig. 35 is a fragmentary elevation, partly in vertical section, illustrating a further step in the operation of preparing the ignition lead; and Figs. 36 and 36ᵃ are fragmentary elevations partly in vertical section, showing the completed opposite end portions, respectively, of the spark plug elbow.

Referring to the drawings, the numeral 1 designates an ignition harness of the general kind employed for engines of the radial type. This ignition harness comprises the substantially circular ignition manifold 2 which comprises an external protective casing, usually of metal, and which is provided at regularly spaced intervals with fittings 3 to each of which is connected one end of a conduit 4, through which runs an ignition wire 4ᵃ extending to one of the spark plugs 5. The outer casing of the manifold houses a plurality of individually insulated conductors 6, one end of each conductor being secured to one of the terminals respectively of one of the magnetos 7. The several conductors 6 are of different lengths, one of such conductors terminating adjacent to each of the fittings 3. Each fitting 3 (Fig. 1ᵃ) is provided with means for mechanically securing to it the outer protective conduit 4 of one of the ignition wires 4ᵃ, and also has provision for electrically connecting the end of the metallic core of a conductor 6 to the ignition wire 4ᵃ in the conduit 4.

As illustrated in Figs. 2 and 3, each conductor 6 comprises a metallic conducting wire or core 8 and insulation 9 which may, for example, be of rubber, braid and lacquer.

In making the manifold, in accordance with one form of the present invention, it is preferred to cable-lay the several conductors 6 so that they twine about each other in spiral turns as shown in Figs. 4 and 5. The several conductors 6 making up the cable-like assembly thus provided are of different lengths as above suggested. For use as herein specifically illustrated merely by way of example, one end of each conductor may be arranged near one end of the assembly, said ends being those which are connected to the magneto terminals, while the opposite ends of the several conductors are arranged each to terminate adjacent to one of the fittings 3 of the manifold when the parts are assembled. Since the number of conductors making up the cable-like assembly thus decreases from point to point along the manifold, the outer casing of the manifold may be made correspondingly to diminish in transverse dimensions or, alternately, it may be of uniform transverse section and the space may be filled by the use of dummy conductors which take the place in the cable of the true conductors beyond the points where the latter terminate at the several fittings.

After having thus cable-laid the conductors 6, a substantially circular transverse section is preferably then imparted to this assembly of conductors by winding insulating material, for example, a specially treated asbestos yarn or properly shaped extruded strands of plastic material into the helical grooves 10 extending around the cable. However, any other suitable method of providing a circular section and substantially smooth cylindrical outer surface 11 (Figs. 6 and 7) may be employed. Having prepared this assembly with its substantially cylindrical and smooth external surface, the next step is to encase it in a flexible metallic sheathing, for example, a wrapping of thin metal ribbon 12 (Figs. 8 and 9). This wrapping may, for example, be of Duralumin foil of approximately 0.0015 inch thick wrapped helically about the cable so as to overlap one-half its width, thus providing a complete metal sheathing 13, Fig. 9. Alternatively, the assembly might be drawn into a tubular metallic casing.

After applying this metal sheathing, the sheathed cable is wrapped with tape 14 (Fig. 10) of a thermoplastic character. Preferably this tape is made of one of the vinyl chloride or vinyl acetate resins, for instance, a polymerized vinyl chloride, such tape being, for example, 0.008 inch thick. Such a tape is a commercial product employed in the automobile industry for wrapping conductors and is of very great elasticity and toughness throughout a wide range of temperatures; it is oil and gasoline resistant (a matter of high importance when it is to be used in the vicinity of an airplane engine or the like) and has high dielectric properties. This tape is wrapped in overlapping spirals and in several concentric layers, for example, as many as twelve layers. Preferably successive layers 15 are of opposite pitch.

In preparation for the next step, suitable holding means is provided designed for the simultaneous application of heat and pressure thereby to integrate the several turns and layers of tape, the heat being so applied (or in fact generated) that the layers of tape are heated substantially uniformly and almost instantaneously, but without injuriously heating the insulating coverings of the several conductors. The molding means may comprise a mold consisting of two or more separable parts 17 and 18 and is of insulating material, for example, wood, the several parts, when operatively assembled, collectively defining a mold cavity 19 of variable dimensions and which is of proper shape to receive a portion at least of the wrapped cable already described. The interior of the mold cavity is lined with metal foil 20, for example, tin, the mold parts being provided with accessibly located binding posts 21 or the like with which the metallic lining 20 is electrically connected and to which electrical conductors as hereafter described may be attached. Provision is made whereby the assembled parts of the mold may be pressed toward each other thereby to press the wrapped cable assembly in a substantially radial direction. As illustrated in Fig. 13, the upper and lower mold members 17 and 18 are slightly separated, as they may be when the cable assembly is first introduced into the mold cavity 19 between them. The lower mold member 18 is shown resting upon a fixed support 22 while the vertically movable platen 23 of a power press rests upon the upper mold member 17 in readiness to apply downward pressure to the latter.

That section of the sheathed and wrapped cable which extends between one of the projecting ends of a conductor 6 and the next, is disposed within the mold cavity 19 and the mold parts are then placed under compressive stress so as radially to compact the layers of wrapping material. Before applying pressure, the metal lining 20 of the mold cavity is connected into a high frequency circuit so as to constitute one condenser plate while the tape covered metal sheathing 13 of the cable is made to constitute the other condenser plate.

The numeral 24 (Fig. 15) designates the tank coil of a well known type of high frequency circuit, having provision for tuning the circuit. This coil forms the primary of which the coil 25 forms a secondary and receives high frequency current from the tuned circuit, for example, of approximately 20,000,000 cycles. This high frequency current is conducted through the high frequency cable 26 to the primary 27 of a resonant circuit whose secondary 28 has its terminals connected to a variable condenser 29 and also to auxiliary condensers 30 and 31 respectively. Each of these condensers 30 and 31 comprises a plate 30$^a$ and 31$^a$ respectively and complemental plates 30$^b$ and 31$^b$ respectively which are connected to and, with the mold lining 20 and the sheathing 13 respectively, constitute condenser plates complemental to plates 30, 31$^a$ respectively. A high frequency field is established between these condenser elements and if the material forming the wrappings be subjected to such high frequency for a period of 45 seconds while the mold parts are under pressure, the several layers 15 of the synthetic resin tape are coalesced so as to form an integral tubular jacket 15$^x$ without crevice or seam. The jacket thus provided is waterproof, oil resistant, highly elastic, and tough and substantially unaffected by any of the temperature conditions to which the ignition manifold of an airplane engine is ever subjected. This jacket 15$^x$ (Fig. 19) also provides very effective insulation while the metallic sheathing 13 upon which this jacket is built forms effective means to prevent radio interferences from the high tension current passing through the conductors forming the cable as well as to enable the heat treatment of the jacket without heating the conductors 6.

Each of the leads 4 from the several fittings to the respective spark plugs 5 may be prepared in the same way as just described except that each of these individual leads (Fig. 1$^1$) contains but a single insulated ignition wire 4$^a$. This single insulated wire 4$^a$ is provided with a metal sheathing 13$^a$ and is wrapped with insulating thermoplastic tape which is consolidated by pressure and high frequency heat to form the jacket 15$^a$ as already described, and this jacket is then enclosed in a flexible metallic protective casing 32$^a$, each having a connection 32$^b$ at one end for engagement with one of the fitttings 3 of the manifold and having a rigid connection 32$^c$ at its opposite end (Fig. 1) for union with the spark plug 5.

After each section of the sheathed and wrapped cable has been subjected to heat and pressure in the mold 17, 18 as above described, a fitting 3 is applied at each point where the end of one of the conduits 6 projects outwardly from the jacket 15. As illustrated in Fig. 1$^a$, each fitting 3 comprises a screw-threaded portion 3$^x$ for mechanical engagement with the internally screw-threaded connection 32$^b$ of the ignition wire conduit, the fitting also including a flange 3$^y$ which is placed in contact with the outer surface of the jacket 15 and is bound down to the jacket by a plurality of wrappings of the tape 14. This portion of the jacket 15, to which the fitting is thus bound, is now placed in a mold 18$^a$ having a metal lined cavity 19$^a$, of suitable shape, for instance as shown in Fig. 14$^a$, the metal lining 20$^a$ being connected to the binding post 21$^a$, and these wrappings of tape are consolidated so as to form an integral mass 15$^m$ permanently uniting the part 3$^x$ to the jacket 15, while at the same time adjoining sections of the jacket 15 are thoroughly integrated.

As already described, the manifold cable and the individual ignition wires are encased in any appropriate type of outer protective covering, for example, a helically wound metallic tape, such as that employed in electrical conduits; a braided metallic tube 32 (Fig. 18); or a sheet metal housing, but preferably such metallic casings should be so applied as to fit very snugly about the jacket and actually exert some degree of radial stress upon the enclosed material, thus to avoid any possibility of air spaces within the casing and providing against creeping of the jacket wiping the casing. As above described, each fitting is provided with means 3$^x$, 32$^b$ for mechanically but removably attaching the jacket 32$^a$ of the individual ignition wire 4 to the manifold, and each fitting is also provided with suitable (preferably resilient) contact means for electrically joining the ends of wires 4$^a$ and 8.

In accordance with a modified and preferred form of the invention (Figs. 20–36$^a$) the first step in making the harness as above described is to assemble conductors 6 so as to form a cable-like core. This core is built up by assembling the individual insulated wires 8 with a core tube 33 (Fig. 20) of flexible insulating material, for instance a synthetic resin such as "Neoprene." Initially the central bore 34 in this core tube is slightly less in diameter than the external diameter of the insulation 9 of one of the conductor wires 8. One of these insulated wires 8 is first inserted in the central bore of the tube 33. To permit such insertion, the core tube 33 is expanded by internal air pressure and while so expanded the conductor is introduced.

Preferably the core tube 33 is furnished with external longitudinal grooves 35, the number of these grooves being one less than the total number of conductors which are to be assembled to form the cable. While the core tube 33 is still expanded and after the central conductor 6$^x$ (Fig. 22) has been drawn through it, the tube 33 is twisted so as to dispose its grooves 35 in helices of a predetermined pitch. After the tube has thus been twisted it is allowed to contract about the central conductor 6$^x$ and when so contracted its frictional grip upon the central conductor is sufficient to retain the twist which has been imparted to the tube. Preferably, before the central conductor 6$^x$ is drawn into the tube, the latter is slotted near one end as indicated at 36 (Fig. 22) and one end of the central conductor is caused to protrude through this slot. The other conductors 6 are now laid in the respective grooves 35 and the cable thus formed is mounted in a jig to facilitate the assembly of the other parts. This jig (not shown) provides a clamp for each end of the cable and also comprises a series of longitudinally spaced rigid supporting elements for positioning and holding the terminal fittings or screw shells 3$^m$ (Fig. 24) which receive the ends of the several individual conductor wires.

Each of these screw shells 3$^m$ comprises a tubular portion 37 externally screw threaded, and a pair of divergent metal plates or wings 38 (Fig. 25) which form a saddle-like structure. The supporting elements of the jig are arranged to receive the screw-threaded end portions of the several screw shells or fittings 3$^m$ and to hold them in definitely spaced relation, with the divergent wings of each shell arranged to straddle the assembled cable structure.

Within each screw shell 3$^m$ there is mounted a disconnect elbow 39 (Fig. 24) of rigid insulating metal, for example porcelain. This disconnect elbow is in effect a tube bent at right angles and having embedded in the inner end of its tubular horizontal leg 40 a metallic insert 41 having a bore designed to receive the bare end of one of the conductor wires 8. The metal insert 41 has a hollow portion coaxial with the upper arm 42 of the disconnect elbow, said hollow portion being internally screw-threaded and constituting positioning means for a short contact spring 43 which is permanently held in place by swedging the upper edge of the part 41 outwardly into contact with the lower spring coils. The internally screw-threaded portion of the part 41 receives a set screw 44 whose lower end engages the end of the conductor wire 8 which is housed in the horizontal leg 40 of the disconnect elbow and thus holds the wire positively in assembled relation with the metal insert 41.

In accordance with one procedure, the several conductors 6 are initially cut to the proper lengths so that each may reach from one end of the assembly to one of the several respective screw shells and the end of each of these wires is secured to one of the screw shells before the wires are wrapped helically about the core tube 33. According to another procedure, the wires are all initially cut to substantially the same length and after having been wrapped around the core tube 33 and after the screw shells $3^m$ have been mounted in place, each conductor is cut to the proper length and the end of its wire is inserted into the corresponding disconnect elbow and thus secured in place.

In order that the harness may be of substantially the same transverse dimensions throughout that portion which is provided with the screw shells, it is preferred to introduce dummy conductors of "Neoprene" to fill in the space in each of the grooves of the core tube 33 which is left empty by the termination of its corresponding conductor 6. Since the parts 40 overlie and form projections at one side of the cable adjacent to each screw shell, there is placed upon the cable assembly between each pair of adjacent screw shells a bridge member 46 (Fig. 24) of "Neoprene" having a channel or groove at its underside to receive that portion of the conductor which leads to the nearest screw shell to the left. These "Neoprene" bridges are somewhat saddle-shaped like the screw shells so as to form continuations of the latter longitudinally of the structure and thus to provide in the finished device a substantially uniform external cross-section. These bridge elements also assist in protecting the wires which they overlie, where such wires diverge outwardly from the main body of the cable toward the respective screw shells to which they are attached. Preferably a thin ribbon of "Neoprene" or other material of similar character (not shown) is wrapped about the assembly at points adjacent to each screw shell in order to protect the insulated wire from any possible abrasion by the edges of the copper foil which forms the metal sheathing.

To one of the wings 38 of each of the screw shells there is soldered one end of a length 45 (Fig. 25) of copper foil ribbon. After the several wires have been connected to their respective screw shells, the bridge members are put in place and the "Neoprene" ribbon wrapped about the assembly, the copper foil (which is attached to the right-hand shell (Fig. 26), that is to say, the shell nearest the end F of the cable structure) is wrapped spirally about the assembled conductors until it reaches the end F of the cable. A manifold fitting C is now slipped over the end of the cable so as to embrace the wrappings of metal foil at this end. The ribbon from the second screw shell is then spirally wrapped around the cable until it reaches the first screw shell to which it is soldered, then the ribbon from the third screw shell is spiralled about the assembly until it reaches the second screw shell to which it is soldered, etc. After all these individual ribbons have thus been spiralled about the assembly, the first ribbon, which is above described, extends from the first screw shell to and within the sleeve portion of the manifold magneto connection C, is spiralled back again as indicated at 47 (Fig. 26) in the opposite direction past all of the several screw shells until it reaches the opposite or left-hand end E of the assembly. Since each of the metal ribbons is wrapped so as to provide an overlap of one-half its width, the result is that in the finished structure there are four layers (Fig. 26$^a$) of copper foil extending from end to end, thus providing a flexible metallic shell or sheath for the entire structure, such sheath being in direct contact with the metal of the several screw shells.

A jacket 48 (Fig. 27) of "Vinylite," "Neoprene" or similar thermoplastic material is now provided, such jacket being a flexible strip whose length is slightly greater than the completed harness and whose width is sufficient to permit it to be wrapped about the cable assembly above described with some surplus for overlap. This jacket is preformed to a generally U-shaped transverse contour and is provided with a series of projecting tubular nipples 49 integrally united to the main body of the jacket and located along the central line of the latter, these nipples being spaced apart distances equalling the spacing of the screw shells of the conductor assembly. The nipples on this jacket are now expanded and slipped over the exposed ends of the screw shells and the assembly, including the cable, screw shells, and jacket member, is now placed upside down in a molding jig 50 (Fig. 29) provided with a cavity of the contour and dimensions of the completed harness. This jig has a series of clamping elements 51 designed to engage the screw-threaded ends of the several screw shells and by means of which the screw shells, the jacket, and the cable assembly may be drawn down very snugly into the lower part of the cavity of the molding jig. The free edge portions 52 and 53 of the jacket are then overlapped and the molding jig is closed and pressed with substantial pressure about the jacket. A high frequency current is now applied substantially as previously described, the plate 30$^b$ (Fig. 15), for example, being connected to any one of the screw shells and the other plate 31$^b$ being connected to a metallic presser member 54 which may be moved along the molding jig from one end to the other. The high frequency current generates heat in the overlapped portions 52 and 53 of the jacket and thus softens the material and causes it to become plastic and cohesive, and as the material is under pressure, it is thus caused to coalesce and form a permanent leakproof seam extending longitudinally of the jacket. Any surplus material formed at the overlap of the edges of the jacket strip is trimmed off after the jacket has been removed from the mold and the outer surface of the jacket is finished in any desired way. The end portion E of the assembly is then placed in a molding jig (not shown) where a metallic presser element is brought forcibly up against the projecting end portion of the jacket material, which at the same time is heated by high frequency current, so that this projecting material becomes soft and cohesive and under the pressure coalesces to form a complete, smooth and leakless end closure 55 (Fig. 31) for that end of the harness. The manifold magneto connection C may be of conventional type or of any suitable form appropriate for connecting the harness to the magneto.

By making the harness in this fashion, there is a complete unbroken metallic layer enveloping all of the conductors from the manifold connection C to the other end of the harness, and this layer is electrically connected with the metallic screw shells, thus providing a perfect radio shield and at the same time constituting one of the plates of the high frequency condenser used in coalescing the jacket material. As described with reference to the earlier modification, this procedure, whereby a high frequency field is used in coalescing the jacket material, makes it possible to provide a snug fitting, completely leakproof jacket for the conductor assembly without endangering the integrity of the insulation of the individual conductors in the process of closing the seams in the jacket material.

The individual spark plug leads are made substantially as follows:

There is first provided a length 66 (Fig. 32) of "Vinylite" or "Neoprene" tubing of an internal diameter slightly less than that of the conductor 57 which is to be placed within it. There are then provided terminal connections 58, all of identical construction and each being a metallic tube having one end portion 59 (Fig. 32) externally knurled, ribbed or roughened, and having an external screw-thread at its other end 60, there being an external shoulder 61 at the inner end of the screw-threaded portion in the ribbed or roughened portion. The end portion 59 of these connections is of somewhat larger external diameter than the bore of the tube 56. The end of the tube 56 is inflated by air pressure and the knurled end portion of one of the connections 58 is inserted in this inflated end and the end is then allowed to cotract over, it thus permanently securing the connection to the tube. A similar connection 58 is then applied to the opposite end of the tube.

A supporting wire or arbor 62 (Fig. 33) is now passed lengthwise through the tube and a length of braided metallic armor 63 is drawn over the length of tubing. Two swedging rings 64 and a hexagonal nut 65 are then slipped on over the armor.

The supporting wire or arbor 62 is now withdrawn and the tube with its armor covering is placed in a blowing jig in which the terminal connections 58 are screwed into suitable spaced fittings (not shown), both of which are hollow. One end of the conductor 57, which is to be placed within the tube 56 (Fig. 34), is introduced through one of the hollow tubular fittings 58, said conductor having first previously been provided with a thimble 56 at its advancing end. Air pressure is now admitted in such a way as simultaneously to expand the tube 56 and to project the conductor wire longitudinally through the expanded tube. When the wire has thus been projected through the tube, the air pressure is released, thus allowing the tube to shrink tightly about the wire.

While the parts are still in the blowing jig, the armor material 63 is stretched out tightly lengthwise and its end portions are preferably wrapped with electrical tape. Cutters then sever the armor at its taped portions to the exact desired length of the completed lead, the tape preventing the armor from fraying during the cutting operation. The device is then removed from the jig and a fitting 67 screwed onto the end of each of the thermal connections 58. A split lead gasket 68 is placed over the end portion of the armor and then one of the swedging rings 64 is slipped along over this lead gasket and the swedging ring is subjected to pressure, thus contracting it tightly about the lead gasket and at the same time firmly pressing the tube and the armor material about the knurled or ribbed portion 59 of the connection 58 and compressing the armor tight against the knurled surface of the fitting 67. A soft packing gasket 69 is then slipped into the fitting at one end of the tube. The conductor wire is of such length as to project out through the fitting 67 and passed through a sleeve 70 of ceramic material (Fig. 35), one end of which is seated in a recess in the fitting 67. A terminal contact 71, having a central bore for the reception of the conducting wire, is now slipped over the conducting wire and into the bore of the ceramic sleeve, and the projecting end of the contact 71 is swedged about the conducting wire so as to hold the parts in assembled relation.

At the opposite end of the ignition lead the wire is pushed through the usual spark plug elbow and the lead gasket and swedging ring are applied in the same way as was done at the opposite end. At this end the terminal connections for the conductor wire may be of any conventional type.

While certain desirable method steps useful in the production of the structures described have been disclosed, it is to be understood that the invention is not to be limited to these precise procedures but is to be regarded as broadly inclusive of any and all equivalents.

I claim:

1. That method of making an ignition harness for internal combustion engines which comprises as steps providing a flexible core tube of synthetic resin, said tube having a central bore, expanding the bore of the tube, and, while it is so expanded, introducing into it a conductor of an external diameter greater than the normal diameter of said bore, and thereafter permitting the bore of the core tube to contract so as snugly to embrace the conductor, laying a series of conductors about the exterior of the core tube, wrapping the assembly with metal foil to provide a continuous metallic sheathing, and disposing a seamless jacket of flexible insulating material about the sheathing.

2. That method of making ignition harness for internal combustion engines which comprises as steps providing a flexible core tube of synthetic resin, said tube having a central bore and longitudinally extending external grooves, expanding the bore of the core tube, and, while it is expanded, introducing into it a conductor whose external diameter is greater than the normal diameter of the bore, while the bore is expanded, twisting the core tube thereby to dispose its external grooves in helical form, and permitting the bore to contract about the central conductor so as snugly to embrace the latter and thereby to preserve the helical arrangement of the grooves.

3. That method of making ignition harness for internal combustion engines which comprises as steps providing a flexible core tube of insulating material, said tube having a central bore and longitudinally extending external grooves, introducing into the bore in the core tube an insulated wire, and so twisting the core tube as to dispose its external grooves in helical form.

4. That method of making ignition harness for internal combustion engines which comprises as steps providing a flexible core tube of insulating material, said tube having a central bore and longitudinally extending external grooves, introducing a conductor into the bore of the core tube, twisting the core tube so that its external grooves assume a helical form, and laying a conductor in each of said helical grooves.

5. That method of making ignition harness for internal combustion engines which comprises as steps providing a flexible core tube of insulating material, said tube having a central bore and longitudinally extending external grooves, slitting the wall of the tube at a point adjacent to but spaced from one end, expanding the bore of the tube, introducing a conductor into the expanded bore of the tube, causing one end of the conductor to protrude through the slit in the tube wall, and allowing the core tube to contract about said conductor.

6. That method of making ignition harness for internal combustion engines which comprises as steps providing a flexible core tube of insulating material, said tube having a central bore and longitudinally extending external grooves, expanding the bore of the core tube, introducing a conductor into the expanded bore of the core tube, permitting the tube to contract about the conductor, disposing a conductor in each of the external grooves of the core tube, mounting upon the assembled core tube and conductors a series of spaced terminals, connecting one end of each of the several conductors to one of the respective terminals, and encasing the assembly in a thin, flexible metallic sheathing.

7. That method of making ignition harness for internal combustion engines which comprises as steps providing a flexible core tube of synthetic resin, said tube having a central bore, introducing a conductor into said bore, assembling a series of conductors about the exterior of said core tube, arranging a series of spaced terminals along the assembly, connecting one end of each conductor to each terminal respectively, mounting a manifold magneto-connection on the one end of the assembly, connecting the opposite ends of the several conductors to said magneto connection, and wrapping the assembly with metallic foil in such a way as to provide a continuous flexible, metallic sheathing for the assembly.

8. That method of making ignition harness for internal combustion engines which comprises as steps introducing a central insulated conductor into an elongate flexible core tube having longitudinal grooves in its outer surface, causing one end of said central conductor to project outwardly through the side wall of the tube, disposing an insulated conductor in each of the external grooves of the core tube, clamping the assembled tube and conductors at spaced points, arranging terminal elements at spaced points along the assembly between the clamps, connecting one end of each of the several conductors to one respectively of said terminals, encasing the assembly in a flexible metal sheathing, and placing a seamless jacket of flexible, insulating material about the sheathing.

9. Method of making ignition harness for internal combustion engines which comprises as steps providing an assemblage of insulated conductors with a flexible core and having spaced terminals to which one end of each conductor respectively is secured, encasing said assemblage in a flexible metallic sheath, wrapping the sheathed assembly with an uncured thermoplastic synthetic resin, making said metallic sheathing to constitute one terminal of a high frequency electrical circuit, and applying pressure to said synthetic resin wrapping by means of an element which constitutes the other terminal of said circuit.

10. Method of making ignition harness for internal combustion engines which comprises as steps providing an assemblage of insulated conductors with a flexible core and having spaced terminals to which one end of each conductor respectively is secured, encasing said assemblage in a continuous sheath of metal foil, providing an open jacket of uncured thermoplastic synthetic resin, wrapping the jacket about said assembly, causing the metal sheathing to constitute one terminal of a high frequency electrical circuit, and successively applying pressure radially of the jacket and endwise of the jacket by means of parts which successively constitute the other terminal of said circuit, thereby to coalesce the material of the jacket and form a leakproof enclosure for the assembly.

11. Method of making ignition harness for internal combustion engines which comprises as steps providing an assemblage of insulated conductors with a flexible core, the assemblage including spaced terminals to which one end of each conductor respectively is secured, encasing the assembly in a flexible metal sheathing, providing an open jacket of uncured thermoplastic resin of a length somewhat greater than that of the assembly and of a width sufficient to permit it to wrap the assembly with surplus for overlapping, wrapping the jacket about the assembly, placing the jacket with its enclosed assembly in a mold, causing the metal sheathing to become one terminal of a high frequency circuit and causing an element of the mold to become the other terminal of said circuit, thereby to heat and coalesce the jacket material at its overlapped portion.

12. Method of making ignition harness for internal combustion engines which comprises as steps providing an assemblage of insulated conductors with a flexible core, the assemblage including spaced terminals to which one end of each conductor respectively is secured, providing the assembly with a continuous sheathing of thin metal foil, providing an open jacket of a thermoplastic insulating material of a length somewhat greater than that of the assembly and of a width sufficient to permit it to wrap the assembly with surplus for overlapping, wrapping the jacket about the assembly, heating the overlapped edge portions of the jacket and pressing them thereby to cause them to coalesce, placing the end of the assembly and jacket in a mold, causing the metal sheath to become one terminal of a high frequency circuit, and causing one of the mold parts to become the other terminal of said circuit.

HOWARD M. WILKOFF.

(References on following page)

REFERENCES CITED

The following references are of record in the file of this patent:

UNITED STATES PATENTS

| Number | Name | Date |
|---|---|---|
| 1,959,526 | Del Mar | May 22, 1934 |
| 295,086 | Waring | Mar. 11, 1884 |
| 1,418,369 | Fisher et al. | June 6, 1922 |
| 2,299,140 | Hanson | Oct. 20, 1942 |
| 1,765,521 | Barrans | June 24, 1930 |
| 1,954,678 | Meissner | Apr. 10, 1934 |
| 2,322,903 | Wilkoff | June 29, 1943 |
| 2,280,771 | Dufour et al. | Apr. 28, 1942 |
| 284,050 | Nichols | Aug. 28, 1883 |

FOREIGN PATENTS

| Number | Country | Date |
|---|---|---|
| 435,557 | Great Britain | Sept. 23, 1935 |
| 421,073 | Great Britain | Dec. 13, 1934 |
| 485,149 | Great Britain | May 16, 1938 |
| 506,607 | Great Britain | June 1, 1939 |